(12) United States Patent
Sharifi (10) Patent No.: US 9,542,488 B2
(45) Date of Patent: Jan. 10, 2017

(54) ASSOCIATING AUDIO TRACKS WITH VIDEO CONTENT

(71) Applicant: Google Inc., Mountain View, CA (US)

(72) Inventor: Matthew Sharifi, Zurich (CH)

(73) Assignee: Google Inc., Mountain View, CA (US)

( * ) Notice: Subject to any disclaimer, the term of this patent is extended or adjusted under 35 U.S.C. 154(b) by 154 days.

(21) Appl. No.: 13/957,944

(22) Filed: Aug. 2, 2013

(65) Prior Publication Data

US 2015/0039646 A1     Feb. 5, 2015

(51) Int. Cl.
| | | |
|---|---|---|
| *G06F 7/00* | (2006.01) | |
| *G06F 17/30* | (2006.01) | |
| *H04N 21/439* | (2011.01) | |
| *H04N 21/4722* | (2011.01) | |
| *H04N 21/81* | (2011.01) | |

(52) U.S. Cl.
CPC ... *G06F 17/30769* (2013.01); *G06F 17/30743* (2013.01); *G06F 17/30749* (2013.01); *H04N 21/4394* (2013.01); *H04N 21/4722* (2013.01); *H04N 21/8113* (2013.01)

(58) Field of Classification Search
CPC . G10L 19/018; H04N 21/812; G06Q 30/0269; A61B 5/0077
USPC ........................................................ 707/769
See application file for complete search history.

(56) References Cited

U.S. PATENT DOCUMENTS

| | | | | |
|---|---|---|---|---|
| 6,345,252 B1* | 2/2002 | Beigi | ................ | G06F 17/30746 704/251 |
| 6,505,160 B1* | 1/2003 | Levy | ................ | G06F 17/30017 455/3.06 |
| 6,766,363 B1* | 7/2004 | Rothschild | ........ | G06F 17/30758 707/999.003 |

(Continued)

FOREIGN PATENT DOCUMENTS

| | | |
|---|---|---|
| EP | 2483889 | 9/2010 |
| WO | 2011041259 A2 | 4/2011 |

OTHER PUBLICATIONS

Magnini et al., "Is It the Right Answer? Exploiting Web Redundancy for Answer Validation," Proceedings of the 40th Annual Meeting on Association for Computational Linguistics, ACL, Jul. 6, 2002, pp. 425-432.

(Continued)

*Primary Examiner* — Hosain Alam
*Assistant Examiner* — Nicholas Allen
(74) *Attorney, Agent, or Firm* — Shumaker & Sieffert, P.A.

(57) ABSTRACT

In one example, a system comprises at least one processor configured to determine an indication of an audio portion of video content, determine, based at least in part on the indication, one or more candidate audio tracks, determine, based at least in part on the one or more candidate audio tracks, one or more search terms, and provide a search query that includes the search terms. The at least one processor may be further configured to, in response to the search query, receive a response that indicates a number of search results, (Continued)

wherein each one of the search results is associated with content that includes the one or more search terms, select, based at least in part on the response, a particular audio track of the one or more candidate audio tracks, and send a message that associates the video content with at least the particular audio track.

17 Claims, 4 Drawing Sheets (56) References Cited

U.S. PATENT DOCUMENTS

| | | | | |
|---|---|---|---|---|
| 6,834,308 | B1* | 12/2004 | Ikezoye | G06F 17/3002 348/E7.071 |
| 6,996,775 | B1* | 2/2006 | Dey | G06F 17/30864 707/E17.108 |
| 8,094,949 | B1* | 1/2012 | Rhoads | H04N 1/00424 382/232 |
| 8,132,103 | B1* | 3/2012 | Chowdhury | G06F 17/30056 715/720 |
| 8,245,253 | B2* | 8/2012 | Gratton et al. | 725/40 |
| 8,341,412 | B2 | 12/2012 | Conwell | |
| 8,463,100 | B2* | 6/2013 | Tse | H04N 5/44543 386/201 |
| 8,484,017 | B1* | 7/2013 | Sharifi et al. | 704/205 |
| 8,489,777 | B2* | 7/2013 | Shah | 709/248 |
| 8,737,817 | B1 | 5/2014 | Izo et al. | |
| 8,751,494 | B2 | 6/2014 | Wessling et al. | |
| 2002/0083060 | A1 | 6/2002 | Wang et al. | |
| 2003/0021441 | A1 | 1/2003 | Levy et al. | |
| 2005/0100113 | A1* | 5/2005 | Corts et al. | 375/295 |
| 2006/0184960 | A1 | 8/2006 | Horton et al. | |
| 2007/0107032 | A1 | 5/2007 | Rachamadugu | |
| 2007/0124756 | A1 | 5/2007 | Covell et al. | |
| 2007/0130580 | A1 | 6/2007 | Covell et al. | |
| 2007/0242880 | A1* | 10/2007 | Stebbings | 382/172 |
| 2007/0244902 | A1* | 10/2007 | Seide | G06F 17/30796 |
| 2008/0244676 | A1* | 10/2008 | DaCosta | 725/116 |
| 2009/0158318 | A1 | 6/2009 | Levy | |
| 2009/0325602 | A1* | 12/2009 | Higgins | H04W 4/02 455/456.2 |
| 2010/0145708 | A1* | 6/2010 | Master et al. | 704/270 |
| 2010/0188580 | A1* | 7/2010 | Paschalakis et al. | 348/571 |
| 2010/0205222 | A1 | 8/2010 | Gajdos et al. | |
| 2011/0078729 | A1* | 3/2011 | LaJoie | G11B 27/28 725/36 |
| 2011/0116719 | A1* | 5/2011 | Bilobrov | 382/217 |
| 2011/0173208 | A1 | 7/2011 | Vogel | |
| 2011/0276157 | A1* | 11/2011 | Wang et al. | 700/94 |
| 2011/0276333 | A1 | 11/2011 | Wang et al. | |
| 2011/0276567 | A1 | 11/2011 | Asikainen et al. | |
| 2011/0311095 | A1 | 12/2011 | Archer | |
| 2012/0016876 | A1 | 1/2012 | Oostveen et al. | |
| 2012/0029670 | A1* | 2/2012 | Mont-Reynaud et al. | 700/94 |
| 2012/0117051 | A1* | 5/2012 | Liu | G06F 17/30967 707/707 |
| 2012/0130805 | A1 | 5/2012 | On et al. | |
| 2012/0227073 | A1* | 9/2012 | Hosein et al. | 725/60 |
| 2012/0239696 | A1 | 9/2012 | Wessling et al. | |
| 2012/0265328 | A1 | 10/2012 | Kadirkamanathan et al. | |
| 2012/0284012 | A1* | 11/2012 | Rodriguez et al. | 704/1 |
| 2012/0296938 | A1* | 11/2012 | Koishida et al. | 707/774 |
| 2013/0013305 | A1* | 1/2013 | Thompson et al. | 704/235 |
| 2013/0031216 | A1* | 1/2013 | Willis et al. | 709/219 |
| 2013/0070093 | A1 | 3/2013 | Rivera et al. | |
| 2013/0144899 | A1* | 6/2013 | Lee | G06F 17/30392 707/759 |
| 2013/0152139 | A1* | 6/2013 | Davis | H04N 21/482 725/61 |
| 2013/0173635 | A1* | 7/2013 | Sanjeev | G06F 17/30825 707/748 |
| 2013/0318114 | A1 | 11/2013 | Emerson, III | |

OTHER PUBLICATIONS

Cano et al., "A Review of Audio Fingerprinting," The Journal of VLSI Signal Processing, vol. 4, No. 3, Nov. 5, 2005, pp. 271-284.
International Search Report and Written Opinion from International Application No. PCT/US2014/048653, 14 pages, mailed Nov. 13, 2014.
Office action from U.S. Appl. No. 13/786,132, mailed Mar. 21, 2014, 10 pages.
Baluja et al., "Content Fingerprinting Using Wavelets," Google, Inc., retrieved from http://scholar.google.com/scholar?q=content+fingerprinting+using+wavelets+&btnG= &hl=en&as_sdt=0%2C24&as_vis=1, Nov. 2006, 10 pp.
Google Nexus 7 review: "Still the best small tablet," retrieved from http://reviews.cnet.com/google-nexus-7/, accessed on Dec. 21, 2012, 8 pp.
Response to Office Action dated Mar. 21, 2014 from U.S. Appl. No. 13/786,132, filed Jun. 19, 2014, 11 pp.
Final Office Action from U.S. Appl. No. 13/786,132 mailed Apr. 15, 2015 10 pp.
Response to Final Office Action from U.S. Appl. No. 13/786,132, filed Jul. 15, 2015 12 pp.
Notice of Allowance from U.S. Appl. No. 13/786,132, mailed Jan. 13, 2016 8 pgs.
International Preliminary Report on Patentability from International Application No. PCT/US2014/048653, mailed Feb. 11, 2016, 10 pp.

* cited by examiner

ASSOCIATING AUDIO TRACKS WITH VIDEO CONTENT

BACKGROUND

Content marketplace systems may provide users with the ability to purchase and/or access downloadable or streaming media content such as mobile applications, audio content and video content. A content marketplace system may include one or more computing devices (e.g., a desktop computer, a server system, a laptop, mobile phone) and/or one or more software applications connected via one or more networks. A content marketplace system may receive a request to purchase and/or access media content from a computing device (e.g., a mobile phone, a tablet computer) via one or more networks (e.g., the Internet). The content marketplace system may provide a user with the ability to download media content to his or her computing device and/or stream the media content from the content marketplace system. For instance, the content marketplace system may receive a request to stream purchased video content, such as a movie, and send the video content as streaming content to the user's device.

Video content may include both a video portion and an audio portion. In some cases, the audio portion of video content may include one or more audio tracks (e.g., songs). In various instances, when listening to an audio track (e.g., on a radio, in a TV show, at a concert), a user may desire information about the audio track in order to purchase the song, learn about other songs or albums by the same artist, or perform other actions. Certain computing devices may be able to perform functions in order to attempt to identify a currently playing audio track and provide information about the currently playing audio track.

SUMMARY

In one example a method includes determining, by a computing system comprising at least one computing device, an indication of an audio portion of video content, determining, by the computing system and based at least in part on the indication, one or more candidate audio tracks, determining, by the computing system and based at least in part on the one or more candidate audio tracks, one or more search terms, and sending, by the computing system, a search query that includes the one or more search terms. The method also includes, in response to the search query, receiving, by the computing system, a response that indicates a number of search results, wherein each one of the search results is associated with content that includes the one or more search terms, selecting, by the computing system and based at least in part on the response, a particular audio track of the one or more candidate audio tracks, and sending, by the computing system, a message that associates the video content with at least the particular audio track.

In another example a system includes at least one processor, wherein the at least one processor is configured to determine an indication of an audio portion of video content, determine, based at least in part on the indication, one or more candidate audio tracks, determine, based at least in part on the one or more candidate audio tracks, one or more search terms, and provide a search query that includes the one or more search terms. The at least one processor is also configured to, in response to the search query, receive a response that indicates a number of search results, wherein each one of the search results is associated with content that includes the one or more search terms, select, based at least in part on the response, a particular audio track of the one or more candidate audio tracks, and send a message that associates the video content with at least the particular audio track.

In another example a computer-readable storage medium is encoded with instructions that, when executed, cause one or more processors to perform operations including determining an indication of an audio portion of video content, determining, based at least in part on the indication, one or more candidate audio tracks, determining, based at least in part on the one or more candidate audio tracks, one or more search terms, and sending a search query that includes the one or more search terms. The computer-readable storage medium is also encoded with instructions that, when executed, cause the one or more processors to perform operations including, in response to the search query, receiving a response that indicates a number of search results, wherein each one of the search results is associated with content that includes the one or more search terms, selecting, based at least in part on the response, a particular audio track of the one or more candidate audio tracks, and sending a message that associates the video content with at least the particular audio track.

The details of one or more examples are set forth in the accompanying drawings and the description below. Other features, objects, and advantages will be apparent from the description and drawings, and from the claims.

DETAILED DESCRIPTION

In some cases, a computing device may attempt to record data (e.g., using a microphone) corresponding to a portion of an audio track, to reduce the data into an audio fingerprint, and to compare parts of the audio fingerprint to parts of one or more fingerprints in a database of known audio tracks. Similarly, identifying audio tracks that occur in video content can be done via audio fingerprinting and matching. Using this process, a potentially compact and discriminative fingerprint of the audio portion of the video content is computed and matched against an index of potentially millions of known audio tracks.

However, determining matches using reduced data can have certain drawbacks. For example, when only a short portion of an audio track is used, or when the audio track is distorted, the computing device may find no matches for the audio track or may find multiple possible matches for a singular audio track. That is, in some instances, matching fingerprints or other data indications may not be sufficient. Even highly discriminative audio fingerprints (e.g., those capable of producing high precision matches) may result in a potentially large number of "false positives," (i.e., erroneous matches) for video content. Such false positives may be valid in the sense that there is a correspondence between the video content and the matched known audio track, but the matched known audio track may or may not be the audio track that is actually used in the video content. For instance, a particularly popular audio track (e.g., a song, dialog from a movie scene, or other audio) may be sampled and/or mixed into later-produced audio tracks, creating multiple audio tracks having the same or similar characteristics. Sampled dialog may range from a single quote to an entire scene. In various instances, the false positive matches may be filtered out, as these "matches" may not be relevant search results to a user.

Techniques of the disclosure are directed to determining one or more known audio tracks to associate with video content (e.g., a movie or television show) by determining a number of candidate audio tracks, determining one or more search terms based on the candidate audio tracks, sending a search query that includes the search terms and determining one or more of the candidate audio tracks to associate with the video content based on the response to the search. That is, techniques of the present disclosure may provide a mechanism to filter matches obtained from matching an indication of video content against a database of indications of a large number of audio tracks. Generally, video content, such as a movie, may include an audio portion and a video portion. The audio portion of the movie may comprise verbal dialog, sound effects, and/or one or more songs. The audio portion may include a song in its entirety or only a short fragment of the song. While watching the movie on his or her device, a user may desire information about a currently playing song included in the audio content, such as the song artist, song title, album, and the like. Techniques of the present disclosure may provide an intelligent viewing experience by identifying soundtrack music and showing users details of a currently playing song (e.g., while the video content is paused).

Content marketplace systems may include information identifying multiple, known audio tracks, as well as information about the known audio tracks, such as song title, artist, album title, and the like. For instance, content market place systems may derive and store audio fingerprints from the multiple, known audio tracks. Techniques of the present disclosure provide a method for identifying known audio tracks that correspond to video content in order to provide information about songs or other audio included in an audio portion of the video content. Specifically, in some examples, techniques of the disclosure enable a device, such as part of a content marketplace system or other computing system, to more accurately determine known audio tracks to associate with the video content based at least in part on the result of a search query, such as an Internet search. Furthermore, techniques of the present disclosure may enable the device to provide a user with information (e.g., artist and song title) about a currently playing audio track included in the video content without necessarily requiring the user to perform a manual search for the information. In this way, techniques of the present disclosure may enhance the viewing experience for the user and/or increase interest in those audio tracks included in the video content.

In one aspect of the present disclosure, a content management unit of a content marketplace system may determine one or more known audio tracks to associate with video content in order to provide a user viewing the video content with information about songs or other audio included in an audio portion of the video content. For instance, the content marketplace system may receive and store new video content. The content marketplace system may receive the new video content from a user or administrator, or may receive or obtain the new video content from other sources (e.g., a production company, a television broadcast, digital or physical media such as a DVD, or other sources). The new video content may include a video portion (e.g., data for generating a video signal for output) as well as an audio portion (e.g., data for generating an audio signal for output). The content management unit may process the new video content in order to provide the new video content to a user (e.g., a customer).

As part of processing the new video content, the content management unit may use the audio portion of the new video content to determine an indication of the audio portion. The content management unit may use the indication to determine one or more candidate audio tracks (e.g., from a database of known audio tracks) that may potentially be associated with the video content. The content management unit may determine one or more search terms based at least in part on the candidate audio tracks, and send a search query that includes the one or more search terms. The content management unit may receive a response to the search query that indicates a number of search results. Each result may be associated with content that includes the search terms. Based on the received response, the content management unit may determine one or more known audio tracks to associate with the video content. The content management unit may send a message (e.g., to other components of the content marketplace system, or to another device) indicating an association between the one or more known audio tracks and the video content. The message may also indicate those sections of the audio portion of the video content that correspond to the respective known audio tracks.

After processing the new video content, the content marketplace system may store the video content as well as information about the associated known audio tracks. Thereafter, responsive to receiving a request from a user to download or stream the video content, the content marketplace system may include data from the associated known audio tracks along with the video content. By using a search query in the determination of the one or more known audio tracks, the content management unit may allow a user to obtain information about audio tracks or songs that are included in the video content even if the audio tracks or songs are not necessarily credited or part of a soundtrack album.

One or more techniques of the present disclosure may improve the accuracy of determining information about audio tracks included in video content. Using techniques of the disclosure, a content marketplace system and/or a content management unit thereof may determine known audio tracks that correspond to sections of the audio portion of the video content. In this manner, the present disclosure may enable a content management unit or other computing device to provide a user with access to more accurate information about songs or other audio tracks included in video content.

Figure 1:
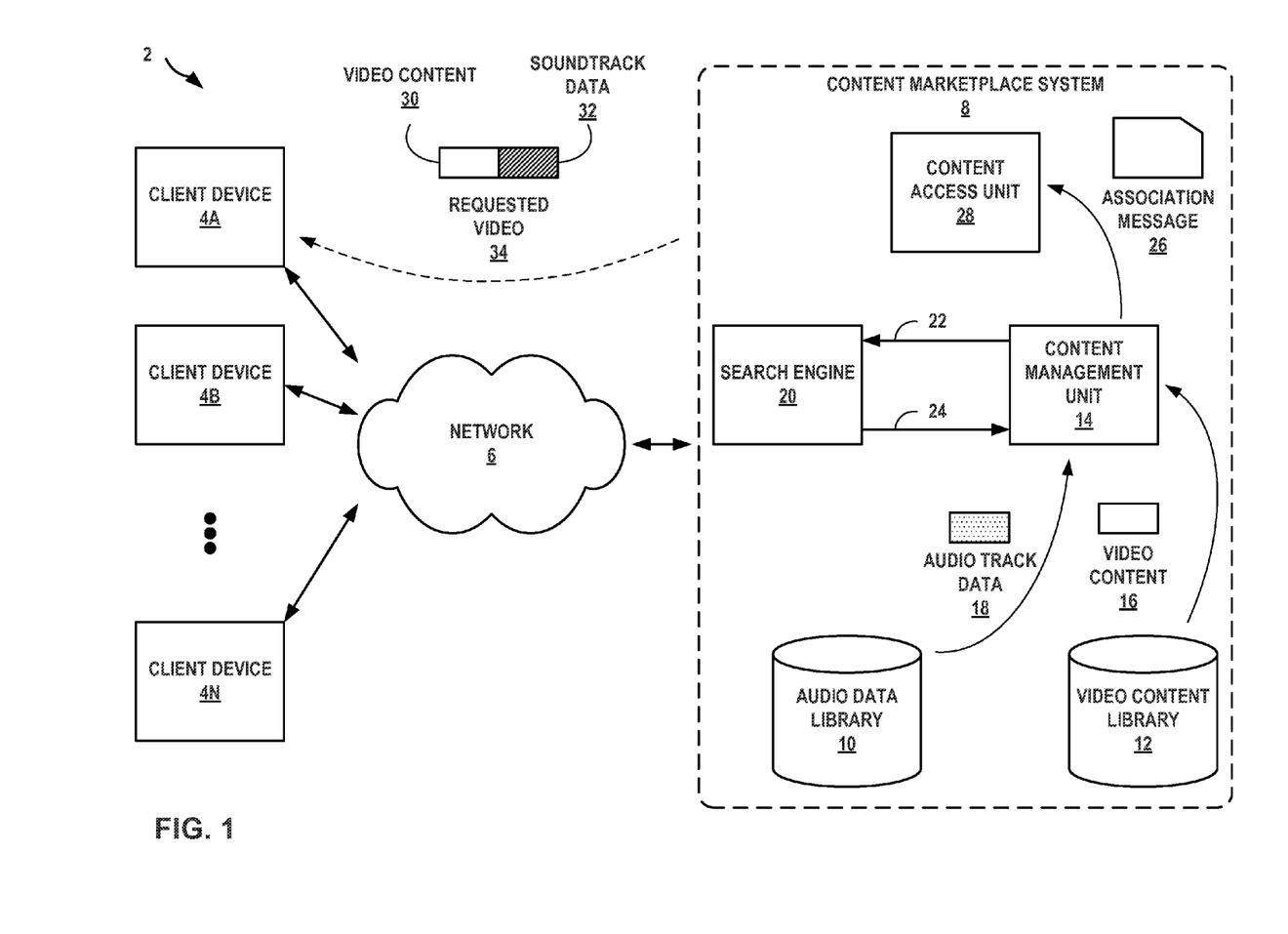
FIG. 1 is a block diagram illustrating an example computing environment in which a content marketplace system may be configured to determine audio tracks associated with video content, in accordance with one or more aspects of the present disclosure.

FIG. 1 is a block diagram illustrating an example computing environment 2 in which a content marketplace system may be configured to identify audio tracks included in video content, in accordance with one or more aspects of the present disclosure. As shown in FIG. 1, computing environment 2 may include client devices 4A-4N (collectively, "client devices 4"), network 6, and content marketplace system 8. Client devices 4 may each be a computing device. Examples of computing devices may include, but are not limited to, portable, mobile, or other devices such as mobile phones (including smartphones), laptop computers, desktop computers, tablet computers, smart television platforms, personal digital assistants (PDA's), server computers, mainframes, and the like. For instance, in the example of FIG. 1, client device 4A may be a tablet computer, client device 4B may be a laptop computer, and client device 4N may be a smartphone. In various instances, client devices 4 may include various components for performing one or more functions such as output devices, input devices, network interface devices, and the like. For example, client devices 4 may include network interface devices for communicating with one or more networks, such as network 6.

Network 6 may represent any communication network, such as a packet-based digital network. In some examples, network 6 may represent any wired or wireless network such as the Internet, a private corporate intranet, or a public switched telephone network (PSTN). Network 6 may include both wired and wireless networks as well as both public and private networks. Content marketplace system 8 may contain one or more network interface devices for communicating with other devices, such as client devices 4, via network 6. For example, client device 4A may transmit a request to view video content via a wireless card to a publicly accessible wide area wireless network (which may comprise one example of network 6). The wide area network may route the request to one or more components of content marketplace system 8, via a wired connection (in this particular non-limiting example).

Content marketplace system 8 may receive the request sent by client device 4A via network 6. Content marketplace system 8 may, in some examples, be a collection of one or more hardware devices, such as computing devices. In other examples, content marketplace system may comprise firmware and/or one or more software applications (e.g., program code) executable by one or more processors of a computing device or a group of computing devices. In yet another example, content marketplace system 8 may be a combination of hardware, software, and/or firmware. In some examples, one or more components of content marketplace system 8 may perform more or other functions than those described in the present disclosure. While shown in FIG. 1 as a unitary system, content marketplace system 8 may include various units distributed over and communicatively connected via one or more networks (e.g., network 6).

As shown in FIG. 1, content marketplace system 8 may include audio data library 10 and video content library 12. In some examples, audio data library 10 and video content library 12 may be separate and distinct from other components of content marketplace system 8. In other examples, audio data library 10 and/or video content library 12 may be included in one or more other components of content marketplace system 8 (e.g., as part of content management unit 14).

Audio data library 10 may include (e.g., in one or more databases) audio track data associated with one or more known audio tracks. Examples of an audio track include, but may not be limited to, a song, a voice recording, a podcast, a ringtone, an audio portion of multimedia content (e.g., video content), or any other audio data. Audio track data for an audio track, in some examples, may include a song title of the audio track, an artist of the audio track, an author (e.g., the composer and/or artist) of the audio track, a duration of the audio track, lyrics for the audio track, or other information about the audio track. Audio track data may also include information about one or more albums on which the audio track is included. That is, the audio track data may include information such as an album playlist (e.g., a list of all the audio tracks included on the album), an album title, an album release date, an album artist, album author(s), or other album information.

In some examples, audio data library 10 may also include known audio tracks. In other examples, audio data library 10 may not include the known audio tracks, but instead may only store associated audio track data. Audio data library 10 may also include one or more indications of known audio tracks, such as audio fingerprints. Audio fingerprints may be determined using various methods. In some examples, audio fingerprints represent a short, distinct digital signature of an audio track. Audio fingerprints may be composed of one or more sub-fingerprints. In some examples, audio data library 10 may store indexed audio fingerprints and/or sub-fingerprints, such as in an inverted index. Audio fingerprints and sub-fingerprints, as well as example determination methods, are further discussed with respect to FIG. 3 below.

Video content library 12 may store video content. Examples of video content may include, but may not be limited to, movies, television shows, webcasts, or other motion picture material. Video content library 12 may store video content files in various container formats, such as the Audio Video Interleave (AVI) container format, the Moving Picture Experts Group (MPEG) container format, or other container formats. In some examples, video content may be user-created. Some video content may include both a video portion and an audio portion stored by video content library 12. A video portion of video content may be encoded using various video encoding formats, such as H.264, MPEG-4, or other formats. An audio portion of video content may be encoded using various audio encoding formats, such as MP3, AAC, or other formats. As previously described, the audio portion of video content may include one or more audio tracks.

Video content library 12 may store metadata and/or soundtrack data associated with the video content. The metadata may be information that describes the video content. Metadata may, for example, include a title, a release date or air date, a duration, a producer, a director, a production studio, a video source (e.g., a username), or other information. Soundtrack data may indicate an album associated with the video content, one or more known audio tracks associated with the video content, and/or the times at which each audio track is played as part of the audio portion of the video content. For instance, soundtrack data associated with a movie may identify a soundtrack album for the movie, one or more audio tracks that are included in the movie, and the start times, end times, and/or durations at which each audio track is used in the movie.

Metadata and/or soundtrack data may, in some examples, be received by content marketplace system 8 from one or more other sources, such as an administrator of content marketplace 8 or another device via network 6. For example, an administrator of content marketplace 8 may upload or otherwise store an episode of a television show to video content library 12 of content marketplace 8. In addition to the episode itself, the administrator may also upload and/or store metadata indicating an episode title, the duration of the episode, an episode air date, or the like to video content library 12. In other examples, one or more components of content marketplace system 8 (e.g., content management unit 14 or content access unit 28) may generate and store metadata and/or soundtrack data.

Content marketplace system 8 may include content management unit 14. In the example of FIG. 1, content management unit 14 may be a computing device (e.g., a server computer) capable of accessing, processing, generating, and/or storing video content and associated soundtrack data. In other examples, content management unit 14 may be software (e.g., an application) or firmware executable by one or more processors of a computing device. In accordance with one or more aspects of the present disclosure, content management unit 14 may receive video content and/or metadata, determine one or more known audio tracks to associate with the video content, and send an association message. In some examples, content management unit 14 may process the video content when the video content is first acquired and/or when the video content is updated (e.g., edited or modified).

For example, content management unit 14 may access video content library 12 and receive video content 16. In some examples, content management unit 14 may also receive metadata associated with video content 16 from video content library 12. Content management unit 14 may process the video content and/or the metadata to determine at least one indication of the video content. The indication may, in one example, be one or more audio fingerprints generated based on the audio portion of the video content. Content management unit 14 may access audio data library 10 and receive audio track data 18. Audio track data 18 may include one or more audio fingerprints, stored in audio data library 10, that are generated based on one or more known audio tracks (e.g., audio tracks "known" to content marketplace system 8). Using audio track data 18, content management unit 14 may search the audio fingerprints included in audio track data 18 using the one or more audio fingerprints generated based on the audio portion of the video content. For instance, content management unit 14 may perform index lookups and/or fingerprint matching to find matches that exist between the video content and known audio tracks in audio data library 10. The fingerprint search may produce matches for various audio tracks included in the video content. In some examples, one or more of the audio tracks included in the video content may produce multiple potential matches. Determination of a set of candidate albums is further discussed with respect to FIG. 3 below.

After determining the set of candidate audio tracks, content management unit 14 may determine one or more search terms based at least in part on the candidate audio tracks. In one example, content management unit 14 may determine search terms by retrieving metadata for one or more of the candidate audio tracks (e.g., from audio data library 10). In some examples, search terms may be text or other data representing information about a candidate audio track, such as a song title or artist (e.g., performing artist name). In some examples, such as when the song is of a classical type, search terms may include a composer name or a conductor name. Search terms may also include text or other data representing information about the video content, such as a movie title. Content management unit 14 may also determine other search terms, such as the type of video content, the type of audio content, or other terms.

In some examples, content management unit 14 may classify candidate audio tracks as "music," "non-music," or other types of audio tracks. In some examples, content management unit 14 may use metadata for the candidate audio tracks to determine whether a candidate audio track is part of a soundtrack album for the video content. Content management unit 14 may then restrict the candidate audio tracks to only those present in the soundtrack album. In any case, content management unit 14 may generate a search query based on the determined search terms.

In the example of FIG. 1, content marketplace system 8 may include search engine 20. Search engine 20 may include hardware, firmware, software, or any combination thereof capable of receiving search queries, performing searches, and/or returning results. In some examples, search engine 20 may search one or more databases, such as corporate databases, knowledge bases, or other information repositories. Such databases or information repositories may be included in search engine 20 or separate and apart from search engine 20, in various examples. In other examples, search engine 20 may perform searches of one or more networks, such as the Internet. For instance, search engine 20 may be a corporate search engine capable of performing searches based on one or more structured queries using a query language (e.g., Structured Query Language), a search algorithm built for a specific database, or a commercial search engine capable of crawling, indexing, and searching web content. While shown as a part of content marketplace system 8 in the example of FIG. 1, search engine 20 may not be a part of content marketplace system 8. That is, in some examples, search engine 20 may be external to content marketplace system 8 (e.g., one or more external database servers) and connected to content marketplace system 8 in other ways, such as via network 6.

In the example of FIG. 1, search engine 20 may be a commercial search engine, capable of searching websites on the Internet (e.g., network 6). Search engine 20 may receive one or more search queries sent by content management unit 14 (e.g., communication 22). Communication 22 may cause search engine 20 to perform one or more searches using search terms defined in each search query. As one example, a search query may include a title for a candidate audio track, an artist for the candidate audio track, and a title for the video content. One example of a search query may be the following: query: "<song name>" "<artist_name>" "<movie_name>". Encapsulating the song name, artist name and movie name in quotes may, in some cases, indicate that these are each to occur in a single phrase in the matching results. In some examples, such as possibly where higher precision is desired, the <song_name> and <artist_name> terms may be combined into a single grouping. Search engine 20 may perform the search, and determine one or more results. In the example of FIG. 1, each of the results may be content (e.g., web content) that includes the search terms that were included in the pertinent search query. That is, in some examples, search engine 20 may determine one or more webpages that each includes the relevant search terms. In other examples, search engine 20 may determine no results. That is, search engine 20 may determine that no webpages or other content includes each of the relevant search terms, such as when there is no connection between the video content and the candidate audio track. In any case, after performing a search based on the received search query, search engine 20 may send a response to content management unit 14.

Content management unit 14 may receive the response (e.g., communication 24), and may select one or more known audio tracks (e.g., from the candidate audio tracks) to associate with the video content. In one non-limiting example, content management unit 14 may select a candidate audio track based on the response to a search query that included a title of the audio track, an artist of the audio track, and a title of the video content as search terms. If the response in communication 24 indicates one or more results (e.g., one or more items of content included all the search terms), then content management unit 14 may select the candidate audio track to be associated with the video content. If the response received in communication 24 indicates no results, then content management unit 14 may not select the candidate audio track. That is, content management unit 14 may filter out the candidate audio track. In other examples, various other criteria may be considered, such as the title of the content resulting from the search, the type of the content, the source of the content, or other considerations. Selection of known audio tracks is further discussed with respect to FIG. 3 below.

Based on the selection of one or more known audio tracks, content management unit 14 may send association message 26. Content management unit 14 may send association message 26 to one or more components of content marketplace system 8 (e.g., content access unit 28) or to components not associated with content marketplace system 8. Association message 26 may indicate the processed video content and the one or more known audio tracks. Association message 26 may also include information indicating which of the known audio tracks appear at which times in the audio portion of the video content. That is, association message 26 may include an indication of the video content, and audio track data for the video content.

As shown in FIG. 1, content marketplace system 8 may include content access unit 28. In some examples, content access device 28 may be a computing device (e.g., a server computer) capable of receiving requests from one or more client devices and responding to the received requests. In other examples, content access unit 28 may be software (e.g., an application) or firmware executable by one or more processors of a computing device to receive requests from client devices and respond to the requests. In the example of FIG. 1, content access unit 28 may receive association message 26. Responsive to receiving association message 26, content access unit 28 may identify an association between video content 16 and the one or more known audio tracks determined by content management unit 14. For instance, content access unit 28 may associate the audio track data with video content 16 to be stored in video content library 12 (e.g., as soundtrack data).

Content marketplace system 8 may receive a request from a client device (e.g., one of client devices 4) and provide the request to content access unit 28. Responsive to receiving the request, content access unit 28 may, in some examples, perform an authentication procedure or one or more other functions unrelated to the techniques of the present disclosure. If content access unit 28, or another component of content marketplace system 8, determines that the client device which sent the request is authorized to access the requested video content, content access unit 28 may access video content library 12, retrieve the requested video content, and retrieve associated metadata and/or soundtrack data. Content access unit 28 may then provide the video content, along with the associated data to the requesting client device (e.g., via network 6).

For example, content marketplace system 8 may receive a request for video content 30 from client device 4A. Video content 30 may, in some examples, be the same as or similar to video content 16 processed by content management unit 14 (e.g., including both an audio portion and a video portion). Content access unit 28 may receive the request and retrieve video content 30 and associated soundtrack data 32 (e.g., data indicating the one or more known audio tracks associated with video content 30), from video content library 12 or another source, such as another content marketplace system. In some examples, content access unit 28 may also retrieve associated metadata. Soundtrack data 32, in some examples, may include one or more indications of which audio tracks are included in the audio portion of video content 30 and at what times the audio tracks appear. Content access unit 28 may send video content 30 and the associated soundtrack data 32 to client device 4A as requested video 34 (e.g., via network 6). In some examples, content access unit 28 may provide a downloadable version of requested video 34 (e.g., as one or more files). That is, in these examples, client device 4A may download a copy of requested video 34 to be stored locally. In other examples, content access unit 28 may stream requested video 34 to the client device, such that client device 4A may require a connection to network 6 in order to access requested video 34.

Client device 4A may include an operating system and one or more applications capable of outputting requested video 34. That is, client device 4A may be capable of receiving requested video 34, playing video content 30 (e.g., including both a video portion and an audio portion) for a user, and displaying soundtrack data 32. By using soundtrack data 32, client device 4A may include functionality to display information about a currently playing audio track included in the audio portion of video content 30 at a display device while a user of client device 4A is watching video content 30 (e.g., displayed at the same display device or a different display device). In one non-limiting example, the display device of client device 4A may be a presence-sensitive display, such as a touchscreen. In some examples, information about a currently playing audio track included in the audio portion of video content 30 may be displayed at a display device concurrently with video content 30. In other examples, the information may be displayed at a display device in response to user input at an input device, such as when the user inputs a selection to pause video content 30 or when the user provides other user input. The input device of client device 4A may, in one non-limiting example, be a presence-sensitive input device, such as a track pad or a touchscreen. By determining one or more known audio tracks to associate with video content, one or more components of content marketplace system 8 may enable client device 4A to display information about a currently playing audio track included in video content 30, such as an episode of a television show, a movie, or any other video content, even when the known audio tracks are uncredited in video content 30.

Techniques of the present disclosure may provide for a potentially more accurate determination of known audio tracks to associate with video content. That is, techniques of this disclosure may increase the accuracy of determining the known audio tracks by performing a comparison search to determine a set of candidate audio tracks, and then generating and sending one or more search queries, such as web search queries, to determine one or more known audio tracks to associate with the video content. Audio tracks included in video content that are longer and/or unique may, in certain instances, result in only a single match from the first search. Audio tracks included in the video content that are short, distorted, or popular may result in multiple potential matches. Determining one or more search terms, sending a search query including the search terms, and selecting from the potential matches based on a received response to the search query may potentially provide more accurate determinations of audio tracks to associate with the video content.

In one non-limiting example, described as a use case for purposes of illustration only, content management unit 14 may process "Movie A" to determine audio tracks included in an audio portion of Movie A. In one scene of Movie A, a first character may be talking to a second character in a bar. The bar may include a jukebox playing a song (e.g., "Song S") that is audible to a viewer of Movie A, but that is not credited. The scene may only last a short while (e.g., 10 seconds). In accordance with the techniques described herein, content management unit 14 may use an indication of the audio portion of Movie A (e.g., an audio fingerprint) to determine candidate audio tracks. Because the bar scene is short and the characters talking are the focus, content management unit 14 may have potentially have some difficulty in determining a candidate audio track for Song S. That is, Song S may be played only for a short duration and may be distorted by the characters' speech, so content management unit 14 may not have enough information to accurately match the song to Song S. Because of the inaccuracy, content management unit 14 may determine a first candidate audio track, "Track T," as well as a second candidate audio track, "Track S" (e.g., representing Song S).

After determining the candidate audio tracks, content management unit 14 may determine search terms (e.g., a first set of search terms including Movie A, Track T, and/or other terms, and a second set of search terms including Movie A, Track T, and/or other terms) and send at least one search query including the search terms to search engine 20. Content management unit 14 may receive a response from search engine 20 indicating few results that include both of the search terms Movie A and Track T. This may be due to the fact that few documents (e.g., webpages) mention both Movie A and Track T in the same page. This may be an indication that Track T is actually not included in Movie A, and thus Track T should not be shown to a viewer of Movie A. Content management unit 14 may receive a response from search engine 20 indicating a large number of results that include both of the search terms Movie A and Track S. This may be an indication that Track S is included in Movie A, and thus information for Track S should be shown to a viewer of Movie A. In this way, techniques of the present disclosure may potentially increase the accuracy of finding known audio tracks to associate with video content, even for short or uncredited audio tracks.

Figure 2:
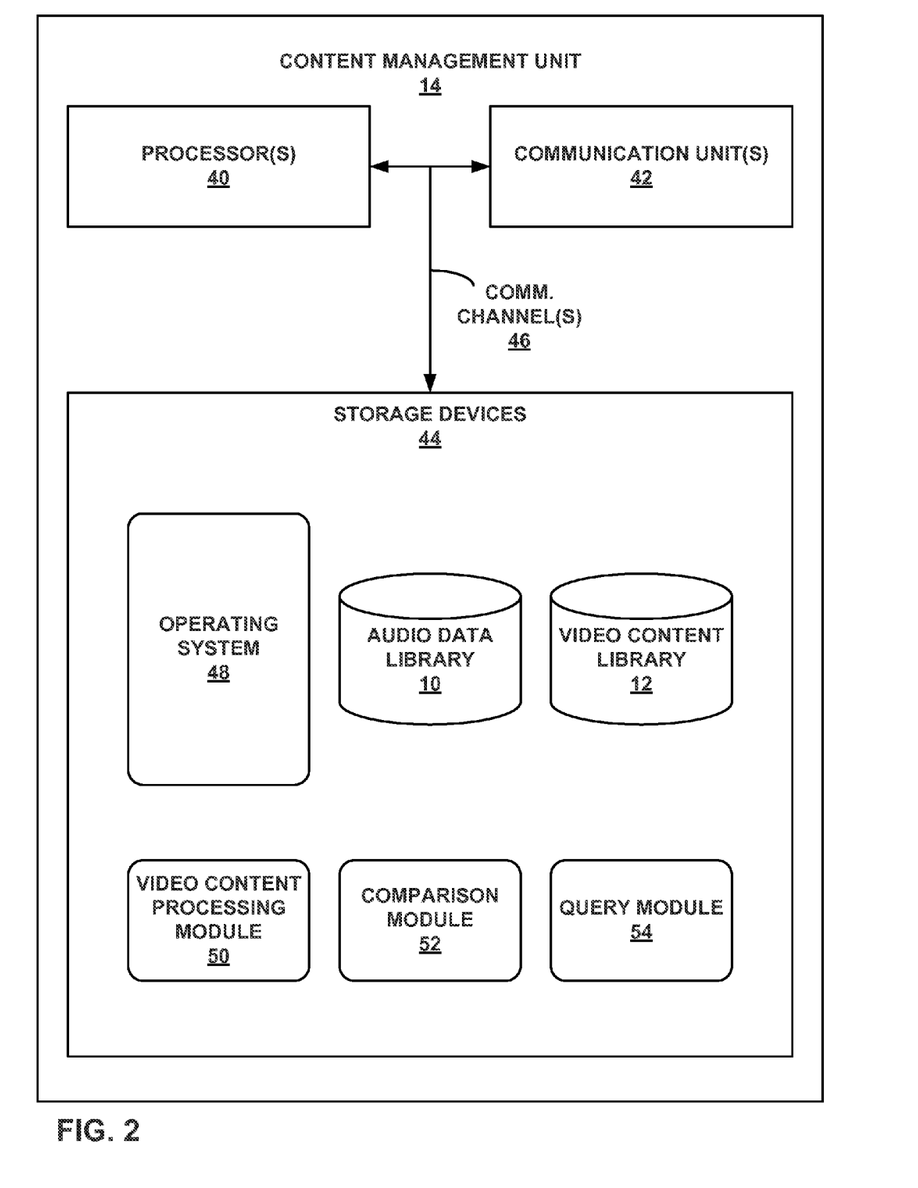
FIG. 2 is a block diagram illustrating one example of a device that may be configured to determine audio tracks to associate with video content, in accordance with one or more aspects of the present disclosure.

FIG. 2 is a block diagram illustrating one example of a device that may be configured to determine audio tracks to associate with video content, in accordance with one or more aspects of the present disclosure. In the example of FIG. 2, content management unit 14 may comprise a device. However, FIG. 2 illustrates only one particular example of content management unit 14, and many other examples of content management unit 14 may be used in other instances. That is, in various examples, content management unit 14 may comprise hardware, firmware, software, or any combination thereof operable to perform one or more techniques of the present disclosure.

As shown in the specific example of FIG. 2, content management unit 14 includes one or more processors 40, one or more communications units 42, and one or more storage devices 44. Content management unit 14 further includes operating system 48, video content processing module 50, comparison module 52, and query module 54. In the specific example of FIG. 2, content management unit 14 may also include audio data library 10, and video content library 12, though in other examples audio data library 10 and video content library 12 may not be included. Each of components 40, 42, and 44 may be interconnected (physically, communicatively, and/or operatively) for inter-component communications. In the example of FIG. 2, components 40, 42, and 44 may be coupled by one or more communications channels 46. In some examples, communications channels 46 may include a system bus, network connection, inter-process communication data structure, or any other channel for communicating data. Modules 50, 52, and 54, as well as operating system 48, audio data library 10 and video content library 12 may also communicate information with one another as well as with other components in content marketplace system 8 of FIG. 1.

Processors 40, in one example, are configured to implement functionality and/or process instructions for execution within content management unit 14. For example, processors 40 may be capable of processing instructions stored in storage devices 44. Examples of processors 40 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 44 may be configured to store information within content management unit 14 during operation. Storage devices 44, in some examples, are described as a computer-readable storage medium. In some examples, storage devices 44 are a temporary memory, meaning that a primary purpose of storage devices 44 is not long-term storage. Storage devices 44, in some examples, are described as a volatile memory, meaning that storage devices 44 do not maintain stored contents when the computer is turned off. Examples of volatile memories include random access memories (RAM), dynamic random access memories (DRAM), static random access memories (SRAM), and other forms of volatile memories known in the art. In some examples, storage devices 44 are used to store program instructions for execution by processors 40. Storage devices 44, in one example, are used by software or applications running on content management unit 14 (e.g., modules 50, 52, and 54) to temporarily store information during program execution.

Storage devices 44, in some examples, also include one or more computer-readable storage media. Storage devices 44 may be configured to store larger amounts of information than volatile memory. Storage devices 44 may further be configured for long-term storage of information. In some examples, storage devices 44 include non-volatile storage elements. Examples of such non-volatile storage elements include magnetic hard discs, optical discs, floppy discs, flash memories, or forms of electrically programmable memories (EPROM) or electrically erasable and programmable memories (EEPROM).

Content management unit 14, in some examples, also includes one or more communication units 42. Content management unit 14, in one example, utilizes communication units 42 to communicate with external devices via one or more networks, such as network 6 of FIG. 1. Communication units 42 may include a network interface card, such as an Ethernet card, an optical transceiver, a radio frequency transceiver, or any other type of device that can send and receive information. Other examples of such network interfaces may include Bluetooth, 3G and WiFi radio components as well as Universal Serial Bus (USB). In some examples, content management unit 14 utilizes communication units 42 to wirelessly communicate with an external device such as one of client devices 4 or content marketplace system 8 of FIG. 1, or any other computing device.

In some examples, content management unit 14 may contain other components not shown in FIG. 2. For instance, content management unit 14 may contain one or more input devices, such as devices configured to receive input from a user through tactical, audio, or video feedback, and/or one or more output devices, such as devices configured to provide output to a user using tactile, audio, or video stimuli.

Content management unit 14 may include operating system 48. Operating system 48, in some examples, controls the operation of components of content management unit 14. For example, operating system 48, in one example, facilitates the communication of modules 50, 52, and 54 with processors 40, communication units 42, and/or storage devices 44. Modules 50, 52, and 54 may each include program instructions and/or data that are executable by content management unit 14. As one example, video content processing module 50 may include instructions that cause content management unit 14 to perform one or more of the operations and actions described in the present disclosure.

As shown in the specific example of FIG. 2, content management unit 14 may include audio data library 10. Audio data library 10 may be stored within storage devices 44. Audio data library 10 may include audio track data, associated with one or more known audio tracks, in a computer-readable format, such as in one or more eXtensible Markup Language (XML) files, text files, or other file types. In some examples, audio data library 10 may also include audio fingerprints (e.g., composed of one or more sub-fingerprints) of the audio tracks. The audio track data and/or audio fingerprints may be stored in one or more databases, such as a relational database or multi-dimensional database.

Audio data library 10 may, in some examples, include an inverted index of stored audio fingerprints for known audio tracks. An inverted index may be a searchable organization of data providing a reference of the file or files in which a search term is located. In some examples, the inverted index may include all sub-fingerprints that make up the audio fingerprints. For instance, the inverted index may include a number of keys, each a number (e.g., one, two, five) of bytes. Each key may be the value of a portion of a sub-fingerprint. For each key, the stored value may indicate one or more known audio tracks having sub-fingerprints that include the associated key. In some examples, the stored value may also indicate a time of the known audio tracks at which the sub-fingerprint that produced the associated key is located. That is, searching the inverted index with part (e.g., one byte, two bytes, five bytes, or more bytes) of a sub-fingerprint of an unknown audio track may result in an indication of what known audio tracks produced a sub-fingerprint having the same data sequence, as well as a time of the known audio track at which the same data sequence is located. Audio data library 10 may provide other components of content management unit 14 with access to audio track data, audio fingerprints, and/or the stored inverted index.

Content management unit 14, as shown in the specific example of FIG. 2, may include video content library 12. Video content library 12 may be stored within storage devices 44. Video content library 12 may store video content, associated metadata, and/or associated soundtrack data in a computer-readable format, such as a video container file (e.g., an avi file, an mpeg file, or other container), an XML file, or other file type. The video content, metadata, and/or soundtrack data may be stored in one or more databases, such as a relational database or multi-dimensional database. In the example of FIG. 2, video content library 12 may provide other components of content management unit 14 with access to video content, metadata, and/or soundtrack data.

As shown in the specific example of FIG. 2, content management unit 14 may include video content processing module 50, comparison module 52, and query module 54. Video content processing module 50 may be operable by processors 40 to retrieve video content and/or metadata from video content library 12, and process the video content and/or metadata to determine one or more indications of the video content. Comparison module 52 may be operable by processors 40 to receive one or more indications of video content, access data stored in audio data library 10 (e.g., the inverted index), and compare the indications of video content to the data to determine one or more candidate audio tracks. Query module 54 may be operable by processors 40 to receive an indication of one or more candidate audio tracks, retrieve audio track data from audio data library 10 based on the candidate audio tracks, generate one or more search terms and send a search query (e.g., to search engine 20 of FIG. 1). Query module 54 may be further operable by processors 40 to receive a response that indicates a number of results and, based at least in part on the response, select a particular candidate audio track to associate with the video content.

In accordance with the techniques of the present disclosure, content management unit 14 may receive new video content and store the video content, as well as any associated metadata, in video content library 12. Content management unit 14 may process the received video content to determine soundtrack data to associate with the video content. In various examples, content management unit 14 may process the received video content in response to receiving the video content, in response to receiving a request for the video content from a client device, in response to some other input (e.g., a modification of the video content), or automatically at a specified time interval (e.g., daily).

Video content processing module 50 may access video content library 12 and retrieve new video content and/or associated metadata. Video content processing module 50 may determine one or more indications of the video content based on the video content and/or the associated metadata. In one example, the one or more indications of the video content may include audio fingerprints of an audio portion of the video content. That is, content processing module 50 may use the audio portion of the video content to generate one or more distinct signatures. Video content processing module 40 may send the one or more determined indications to comparison module 52.

Comparison module 52 may receive the one or more indications of video content from video content processing module 50. Comparison module 52 may determine one or more candidate audio tracks, based at least in part on the indications received. In some examples, comparison module 52 may access audio data library 10 and use the one or more received indications (e.g., audio fingerprints) to perform a search of audio data library 12 (e.g., using the inverted index) to determine known audio tracks which resulted in similar sub-fingerprints. In some examples, if the search results in a threshold number (e.g., one, two, or three) of matches to the same known audio track, comparison module 52 may add the known audio track to the set of candidate audio tracks. As the threshold number of matches is increased, the set of candidate audio tracks may include fewer known audio tracks, with each candidate audio track more likely to be associated with the video content.

In some examples, such as where the video content is popular, or includes popular audio tracks, comparison module 52 may determine a large number of candidate audio tracks. For instance, the video content may have a very popular scene, the audio of which was subsequently sampled in a number of audio tracks. Comparison module 52 may add each of the known audio tracks using the sample to the set of candidate audio tracks, even if the audio tracks were not necessarily used in the video content. That is, the set of candidate audio tracks may potentially include a number of incorrect or erroneous known audio tracks. Comparison module 52 may send an indication of the one or more candidate audio tracks to query module 54.

Query module 54 may receive an indication of the one or more candidate audio tracks from comparison module 52. Query module 54 may determine one or more search terms based at least in part on the received indication, and may send one or more search queries that include the search terms. In one non-limiting example, query module 54 may access audio data library 10, and determine search terms based on audio track data for the candidate audio tracks. For instance, query module 54 may determine a search term indicating the name of a candidate audio track. As another example, query module 54 may determine a search term indicating the artist of a candidate audio track, composer of a candidate audio track, album of a candidate audio track, or other information.

Query module 54 may determine search terms based on other information, such as the video content. In one non-limiting example, query module 54 may determine a search term indicating a title of the video content (e.g., by accessing video content library 12). In other examples, query module 54 may determine a search term indicating other information regarding the video content, such as a producer of the video content. Search terms may begin and end with quotation marks. That is, query module 54 may retrieve information and enclose the information in quotation marks to determine a search term. In other examples, search terms may not include quotation marks. In yet other examples, search terms may be determined by combining retrieved information and/or other information. For instance, query module 54 may retrieve an artist and a title for a candidate audio track, combine the retrieved information with other characters (e.g., a space character between the artist and title), and add quotation marks to the combination. In various instances, query module 54 may determine a variety of different search terms, based on the video content, the candidate audio tracks, and/or other considerations.

Query module 54 may generate and send one or more search queries. A search query may be a command and/or data sent to a search engine (e.g., search engine 20 of FIG. 1) that causes the search engine to perform a search and return a response. In some examples, a search query may be text data, such as data indicating a title and artist of a candidate audio track, as well as a title of the video content. In other examples, the search query may represent a command or instruction, such as a Structured Query Language (SQL) command. In some examples, query module 54 may generate a single search query. In other examples, query module 54 may generate multiple search queries. For instance, query module 54 may determine one or more sets of search terms. Each set corresponding to a candidate audio track, and may generate a separate search query that includes each set of search terms. That is, query module 54 may generate search queries that each correspond to a respective candidate audio track. Query module 54 may communicate with communications units 42 (e.g., via communication channels 46) to send the one or more search queries. In some examples, content management unit 14 may send the one or more search queries to other components associated with content marketplace system 8, such as search engine 20. In other examples, content management unit 14 may send the one or more search queries to one or more components not within content management unit 14, such as external components connected via network 6.

In one non-limiting example, content management unit 14 may send a search query including a set of search terms. The search query and search terms may correspond to one of the candidate audio tracks. Content management unit 14 may receive a response that indicates a number of search results for the search query. Search results may each be content, such as webpage, a data element, a plurality of data elements, a document (e.g., a text file or image file), or other content. Each search result may be related to the one or more search terms that were included in the search query. For instance, each search result may be a webpage that includes the one or more search terms. In another example, each search result may be text files that each includes at least some of the search terms. In any case, communication units 42 of content management unit 14 may receive the response, and may provide data indicating the response to query module 54.

Query module 54 may receive data indicating the response, and may select a candidate audio track to be associated with the video content. That is, based at least in part on the received response, query module 54 may select a particular audio track (from the candidate audio tracks) to associate with the video content. In some examples, query module 54 may select a particular audio track based on the number of results included in the response. For instance, query module 54 may determine one or more search terms for the particular audio track (e.g., a title of the particular audio track, an artist of the particular audio track and a title of the video content) and cause communications units 42 to send a search query including the determined search terms. Query module 54 may receive data indicating a response to the search query from communications units 42. Query module 54 may determine the number of results included in the response, and compare the number of results to a threshold value, such as 1 result, 100 results, 1,000 results, or other number of results. If the number of results included in the response is equal to or greater than the threshold value, query module 54 may select the particular audio track.

In some examples, the threshold value may be a set value, such as a value determined by an administrator of content management unit 14. In other examples, the threshold value may be determined by one or more components of content management unit 14. For instance, content management unit 14 may determine the threshold value by sending one or more queries each including a portion of the search terms, receiving one or more responses, and determining the threshold value. Content management unit 14 may send a first search query including a title of a candidate audio track and the artist of the candidate audio track and/or a second search query including the title of the video content. Content management unit 14 may receive a response to the search query or queries, and may determine the threshold value based on the number of results included in the response. As one non-limiting example, content management unit 14 may determine the threshold value to be a certain percentage (e.g., 50%, 10%, or other value) of the results included in response to the first and/or second search query. By determining the threshold value based on other search queries, content management unit 14 may account for the popularity or unpopularity of an audio track and/or video content when determining audio tracks to associated with the video content.

After query module 54 selects a particular audio track from the candidate audio tracks, content management unit 14 may send an association message (e.g., via communication units 42) to one or more components of content marketplace system 8. Query module 54 may also, in some examples, generate soundtrack data to be stored in video content library 12. The association message may indicate the particular audio track to associate with the video content and/or the times during the video content at which known audio track is used. In this way, content management unit 14 may identify known audio tracks to associate with video content. In addition, content management unit 14 may potentially reduce or negate the need for content marketplace system 8 to include extensive storage for all known audio tracks, instead only using audio track data and/or audio fingerprints, while improving flexibility in determining short and/or distorted audio tracks included in an audio portion of video content. Moreover, by providing audio track information along with requested video content, content marketplace system 8 may enable viewers of the video content to receive information (e.g., when pausing the video content or in subtitles for the video content) about currently playing audio tracks in the video content without having to manually search for such information.

Figure 3:
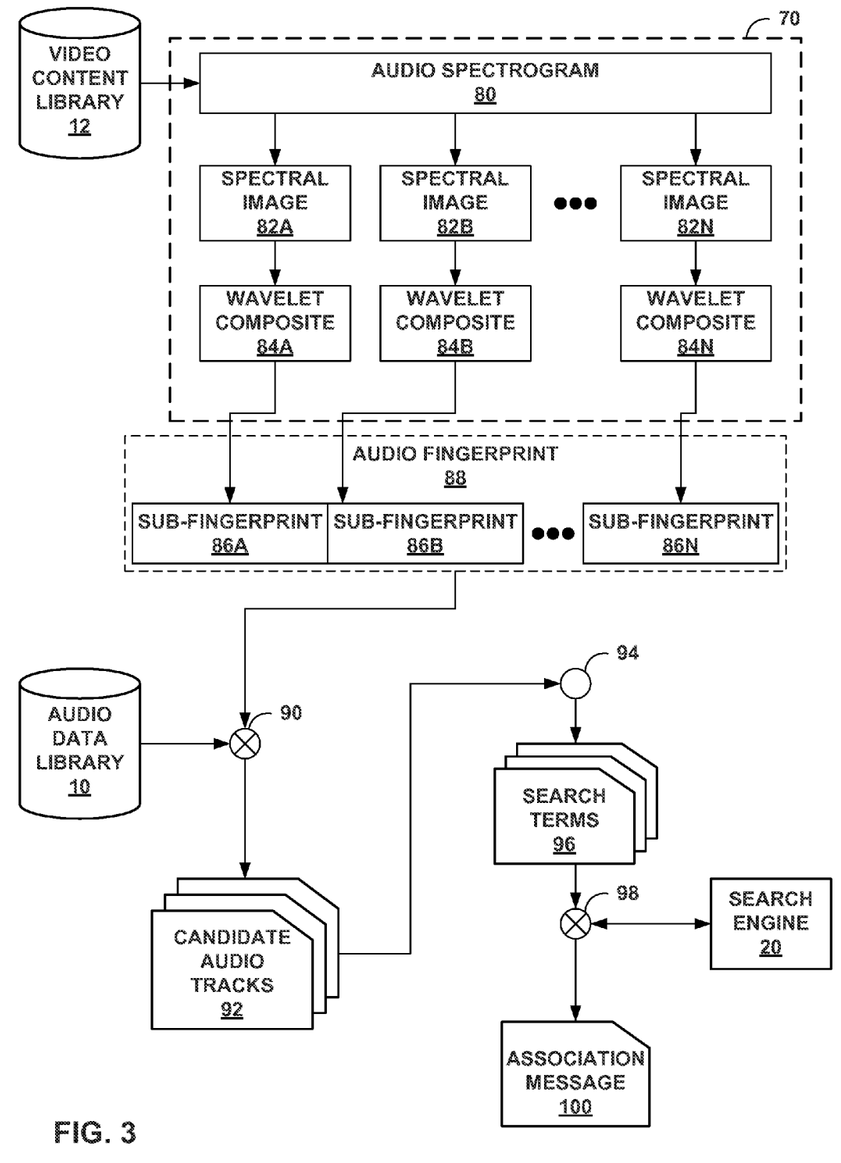
FIG. 3 is a block diagram illustrating an example process for determining audio tracks to associate with video content, in accordance with one or more aspects of the present disclosure.

FIG. 3 is a block diagram illustrating an example process for determining audio tracks to associate with video content, in accordance with one or more aspects of the present disclosure. FIG. 3 illustrates the operation of one particular example process, and many other possible processes may be used in other examples. For purposes of illustration only, the example process is performed by and described within the context of content management unit 14 of content marketplace system 8, as shown in FIGS. 1 and 2. Content management unit 14 may retrieve video content and determine one or more indications of the video content (e.g., audio fingerprints). Content management unit 14 may use the one or more indications to determine a set of candidate audio tracks, determine one or more search terms based at least in part on the candidate audio tracks, send at least one search request including the search terms, and receive a response to the one or more search requests. Based at least in part on the response, content management unit 14 may select a particular audio track from the set of candidate audio tracks. Content management unit 14 may send an association message indicating the particular audio track to associate with the video content (e.g., as soundtrack data).

Content management unit 14 may access video content library 12, and retrieve video content (e.g., video content 16). In the example of FIG. 3, content management unit 14 may use video content 16 to determine one or more audio fingerprints. Various methods of generating one or more audio fingerprints may be used in accordance with techniques of the present disclosure. In one non-limiting example, audio fingerprints may be generated by applying wavelet transforms to a number of subsets of a spectrogram generated based on the audio portion of video content 16. Another example method of generating audio fingerprints may include generating feature vectors (based on amplitude, pitch, bandwidth, bass, and other characteristics) based on an audio signal. Further details regarding the example process for creating fingerprints as described in FIG. 3 can be found in Baluja, Shumeet, and Michele Covell. "Content fingerprinting using wavelets." (2006): 198-207.

In the example of FIG. 3, grouping 70 may represent operations performed by video content processing module 50 of content management unit 14, according to one example. Video content processing module 50 may receive video content 16 and determine audio spectrogram 80. Audio spectrogram 80 may be a spectrogram of the audio portion of video content 16. That is, audio spectrogram 80 may be a two-dimensional image of a time-varying spectral representation displaying the spectral density of the audio portion of video content 16 over the duration of the video content. In some examples, audio spectrogram 80 may not represent the full duration of the audio portion of video content 16 but instead may represent only a short section of the audio portion.

Video processing module 50 may determine one or more spectral images based at least in part on audio spectrogram 80. In the example of FIG. 3, spectral images 82A-82N (collectively "spectral images 82") may each represent a section, or subset, of the spectrogram. In some examples, spectral images 82 may be uniform in time length. That is, each spectrogram subset may cover the same duration (e.g., 20 milliseconds, 1.5 seconds, or other duration). In other examples, spectral images 82 may cover different durations. Spectral images 82 may be determined at random time positions of the spectrogram, or may be determined at specific intervals (e.g., every 10 milliseconds, every 2 seconds, or other interval). One or more of spectral images 82 may be based on sections of the audio portion of video content 16 which include an audio track. For instance, spectral image 82A may represent a section including one or more audio tracks, and spectral image 82B may represent a section including one or more other audio tracks.

For at least one of spectral images 82, video content processing module 50 may, in some examples, determine one or more wavelet images. A wavelet image may be a two-dimensional image representing the result of applying a function commonly known as a "wavelet transform" to another two-dimensional image. Video processing module 50 may determine wavelet images by applying one of a number of different types of wavelet transforms to spectral images 82. Such types of wavelet transforms may include discrete wavelet transforms, complex wavelet transforms, or other types of wavelet transforms. The wavelet transforms may employ one of a number of different wavelets, such as Mathieu wavelets, Mexican hat wavelets, or Haar wavelets, to name only a few non-limiting examples.

Based on the determined wavelet images, video content processing module 50 may determine wavelet composites 84A-84N (collectively "wavelet composites 84"). Wavelet composites 84 may each be a two-dimensional image representing distinctive features of the underlying spectral image. In some examples, wavelet composite 84 may be determined by combining one or more wavelet images. For instance, video content processing module 50 may generate wavelet composite 84A by combining wavelet images (e.g., all determined from spectral image 82A) including the top coefficient magnitudes. That is, video content processing module 50 may combine the wavelet image including the coefficient of the largest magnitude with the wavelet image including the coefficient of the second largest magnitude, and so on. In various examples, the number of combined wavelets may range from one wavelet image to multiple wavelet images (e.g., 200 or more wavelet images).

The determined wavelet composites 84 may constitute a two-dimensional sub-fingerprint of the underlying section of audio portion from which it was formed. For instance, wavelet composite 84A may be a sub-fingerprint of the audio portion represented by spectral image 82A. Thus, for example, wavelet composite 84A and wavelet composite 84B may each be a sub-fingerprint of the audio portion of video content 16. Based on wavelet composites 84, video content processing module 50 may determine binary representations of the sub-fingerprints, such as sub-fingerprints 86A-86N (collectively "sub-fingerprints 86"). That is, video content processing module 50 may determine sub-fingerprint 86A based on wavelet composite 84A, sub-fingerprint 86B based on wavelet composite 84B, and so on. Each of sub-fingerprints 86 may include a number of bytes, such as 50, 100, or another number of bytes.

As shown in FIG. 3, sub-fingerprints 86 may, together, represent audio fingerprint 88. Audio fingerprint 88 may be a binary representation of the audio portion of video content 16. In various examples, an audio fingerprint may include as many sub-fingerprints as may be needed (e.g., 10, 100, 1000, or other number) to represent the underlying audio (e.g. the audio portion of video content 16, an audio track, or other audio). In some examples, such as where sub-fingerprints are generated at a uniform rate, the total number of sub-fingerprints may be proportional to the length of the audio used to generate the fingerprint.

Comparison module 52 of content management unit 14 may perform search 90. Search 90 may include using one or more indications of video content 16 (e.g., audio fingerprint 88) to determine a set of candidate audio tracks. In various examples, search 90 may be performed using a number of techniques. In the example of FIG. 3, search 90 may utilize the inverted index stored in audio data library 10 to determine the set of candidate audio tracks. For instance, search 90 may include partitioning each of sub-fingerprints 86 into a number of segments (e.g., each 5 bytes in size), and using each segment to search the inverted index for matching keys. Comparison module 52 may use the inverted index to determine which sub-fingerprints of the known audio tracks also include segments corresponding to the matching keys. In some examples, none of the known audio tracks may include segments that correspond to the matching keys. This may be the case when, for instance, an audio track included in video content 16 is not included in audio data library 10, when the audio track included in the audio portion of video content 16 is too distorted (or too short for an accurate sub-fingerprint to be determined), or other such cases. In other examples, only a single sub-fingerprint of a known audio track may correspond to a matching key or multiple sub-fingerprints of various known audio tracks may correspond to a matching key.

Comparison module 52 may, as part of search 90, maintain a count of each known audio track indicated by one or more keys. In other words, each key corresponding to a segment of a sub-fingerprint determined from video content 16 may indicate a "hit" for one or more sub-fingerprints of known audio tracks. The hits may be counted as part of search 90. In some examples, known audio tracks which receive a threshold number of hits may be determined as matches. In other examples, any known audio tracks that receive even a single hit may be determined as matches. In performing search 90, comparison module 52 may, in some examples, account for the ordering of the segments when determining matches using the index. That is, a known track, track X, may only be determined as a match if a segment of a first sub-fingerprint (e.g., sub-fingerprint 86A) resulted in a hit on track X at a time, T, of track X and a segment of a subsequent sub-fingerprint (e.g., sub-fingerprint 86B) resulted in a hit on track X at a time of track X subsequent to time T.

In some examples, search 90 may include different or additional procedures for determining one or more known audio tracks. For instance, search 90 may include performing a secondary search using more error-resistant and/or computationally intensive methods. For ease of understanding, search 90 as shown in FIG. 3 may not include different or additional procedures. That is, after comparison module 52 determines one or more matches using the inverted index of audio data library 10, comparison module 52 may determine the matches as candidate audio tracks 92. Candidate audio tracks 92 may be data including song titles or other information identifying the known audio tracks included in the set. In other examples, candidate audio tracks 92 may include more information for each audio track (e.g., audio fingerprints of the audio tracks, sub-fingerprints of the audio tracks, or other information).

In the example of FIG. 3, candidate audio tracks 92 may also include indications of times at which each candidate audio track appears in video content 16. That is, each of candidate audio tracks 92 may include information identifying the part of video content 16 that generated the match. For instance, candidate audio tracks 92 may include information indicating that Track X was determined based on a fingerprint match corresponding to the 1:22:38 to 1:23:20 period of video content 16. In some examples, indications of times of video content 16 may be distinct, such as where each of candidate audio tracks 92 matches a time period of video content 16 that is not matched by any other candidate audio track. In other examples, such as where video content 16 includes distorted audio or short segments of audio, multiple candidate audio tracks may match the same or overlapping time periods. In any case, comparison module 52 may determine candidate audio tracks 92 and output data included in candidate audio tracks 92 (e.g., to one or more other components of coordination unit 14).

Query module 54 may receive the data included in candidate audio tracks 92 and perform operation 94 to determine search terms 96. As part of operation 94, query module 54 may determine search terms based on candidate audio tracks 92. For instance, query module 54 may determine a title of each candidate audio track included in candidate audio tracks 92. In some examples, query module 54 may also determine an artist of each candidate audio track. In other examples, query module 54 may determine a composer of the candidate audio track, a producer of the candidate audio track, a genre of the candidate audio track, or other information. In various examples, query module 54 may determine search terms by using data included in candidate audio tracks 92 and/or by accessing data stored in audio data library 10.

Operation 94 may include determining search terms based on video content 16. For instance, query module 54 may determine a title of video content 16, a producer of video content 16, a director of video content 16, or other information. In some examples, query module 54 may determine search terms for video content 16 by accessing data within video content library 12. Operation 94 may also include determining general search terms. That is, query module 54 may determine one or more search term that do not correspond to a candidate audio track or to video content 16. Such general search terms may be used to narrow the potential search results, narrow the search area, or serve other function. As one non-limiting example, query module 54 may determine the word "soundtrack" as a search term. As another example, query module 54 may determine a search term that, when send to search engine 20, will cause search engine 20 to exclude certain searchable content from the search or only include specific searchable content. For instance, query module 54 may determine a search term limiting the search to a specific website, database, or media type. As another example, query module 54 may determine one or more search terms to exclude certain websites or media types from the search.

In the example of FIG. 3, search terms 96 may include one or more sets of search terms, each set corresponding to one of candidate audio tracks 92. Each set of search terms may include different search terms (e.g., titles of the respective candidate audio tracks), the same search terms (e.g., a title of video content 16), or both. For instance, search terms 96 may include a first set of search terms corresponding to a first candidate audio track, a second set of search terms corresponding to a second candidate audio track, and a third set of search terms corresponding to a third candidate audio track. The first set of search terms may include a title of the first candidate audio track, an author of the first candidate audio track, and a title of video content 16. The second set of search terms may include a title of the second candidate audio track, a composer of the second candidate audio track, a general search term limiting the search to a specific website, and the title of video content 16. The third set of search terms may include a title of the third candidate audio track and the title of video content 16. In various examples, numerous other combinations of search terms are possible.

After performing operation 94, query module 54 may use search terms 96 to perform search 98. Search 98 may include sending one or more search queries to search engine 20, receiving one or more responses to the queries, and, based on the responses, selecting one or more particular audio tracks from candidate audio tracks 92. In the example of FIG. 3, query module 54 may generate a separate search query for each set of search terms in search terms 96. That is, each search query may include a single set of search terms, and may correspond to a single candidate audio track of candidate audio tracks 92. In some examples, a search query may include only one or more of search terms 96. In other examples, search queries may include more or other information, such as an indication of correlation between certain search terms. For instance, a search query may include quotation marks around certain search terms (e.g., a title of an audio track, a title of video content, and other multi-word search terms) or may indicate the maximum separation allowable in a result between two or more of a plurality of search terms (e.g., an indication that a first search term must be within a certain number of words of a second search term). That is, the search query may include instructions to restrict results to content that includes the plurality of search terms within a threshold distance from one another. As another example, a search query may include data indicating the search instruction to execute, the type of search to be performed, or other criteria.

Query module 54 may select a particular audio track based on the number of results included in the response to a search query that corresponds to the particular audio track. In some examples, query module 54 may select the particular audio track when the number of results included in the response exceeds a threshold value defined by an administrator or user of coordination unit 14. In other examples, query module 54 may determine the threshold value. For instance, query module 54 may determine the threshold value by sending one or more other search queries, such as a search query only including the title of video content 16 and/or a search query including the title of the particular audio track and the artist of the particular audio track. In response to sending the other search query or search queries, query module 54 may receive one or more responses, and may determine the threshold value based on the results included in the responses. In other words, query module 54 may, as part of search 98, send search queries to determine a baseline level of results in order to determine whether or not a candidate audio track will be selected.

In some examples, query module 54 may also select the one or more particular audio tracks based additionally on the time at which the particular audio tracks occurred during video content 16. For instance, candidate audio tracks 92 may include data indicating that two or more candidate audio tracks correspond to the same or a similar time period of the audio portion of video content 16. The same or similar time period may be a matter of milliseconds, seconds, or even minutes (e.g., 5 seconds, 15 seconds, or other measure). In the event that two candidate audio tracks correspond to a similar time period, query module 54 may select, as a particular audio track, the candidate audio track which corresponds to the response that has the largest number of results.

In one non-limiting example, described as a use case for purposes of illustration only, a movie, "Movie A," may include a scene with only a short duration of a song, Song B. Based on the indication of the audio portion of the video content, content management unit 14 may determine two candidate audio tracks, Track X and Track Y, that each correspond to song B. That is, content management unit 14 may determine that Track X and Track Y may both correspond to Song B. Because Track X corresponds to a time period of Movie A that is the same or similar to a time period of Movie A corresponded to by Track Y, query module 54 may select Track X as the particular audio track if a search for "Track X Movie A" produces a response having more results than a search for "Track Y Movie A." Conversely, if the search that corresponds to Track Y produces more results, query module 54 may select Track Y as the particular audio track. In this way, search 98 may enable content management unit 14 to "crowd source" the determination of audio tracks to associate with video content 16. That is, by selecting one candidate audio track over the others, based on the number of results included in the respective responses, query module 54 may improve the accuracy of determining audio tracks included in video content that may be difficult to identify, but that may be known or understood by others. In any case, query module 54 may select one or more particular audio tracks from candidate audio tracks 92.

As shown in FIG. 3, after performing search 98, query module 54 (or other component of content management unit 14) may send association message 100 (e.g., to one or more other components of content management unit 14 or content marketplace system 8). Association message 100 may include an indication of the particular audio track or audio tracks resulting from search 98. In some examples, association message 100 may include other information, such as an indication of video content 16, an indication of one or more albums to be associated with video content 16, one or more indications of the times at which each of the particular audio tracks is used in video content 16, or other information. For instance, query module 54 may send association message 100 to content access unit 28. Association message 100 may include information audio track data for the particular audio track or tracks to associate with video content 16, and indications of when each of the particular audio tracks is used in video content 16. Content access unit 28 may, in some examples, store the received information as soundtrack data associated with video content 16 to video content library 12. In other examples, content access unit 28 may provide the received information to a client device along with the video content. In this way, content management unit 14 may enable content marketplace system 8 to provide users with audio track information for audio tracks included in movies and other video content by providing a flexible method of audio track identification for video content.

Figure 4:
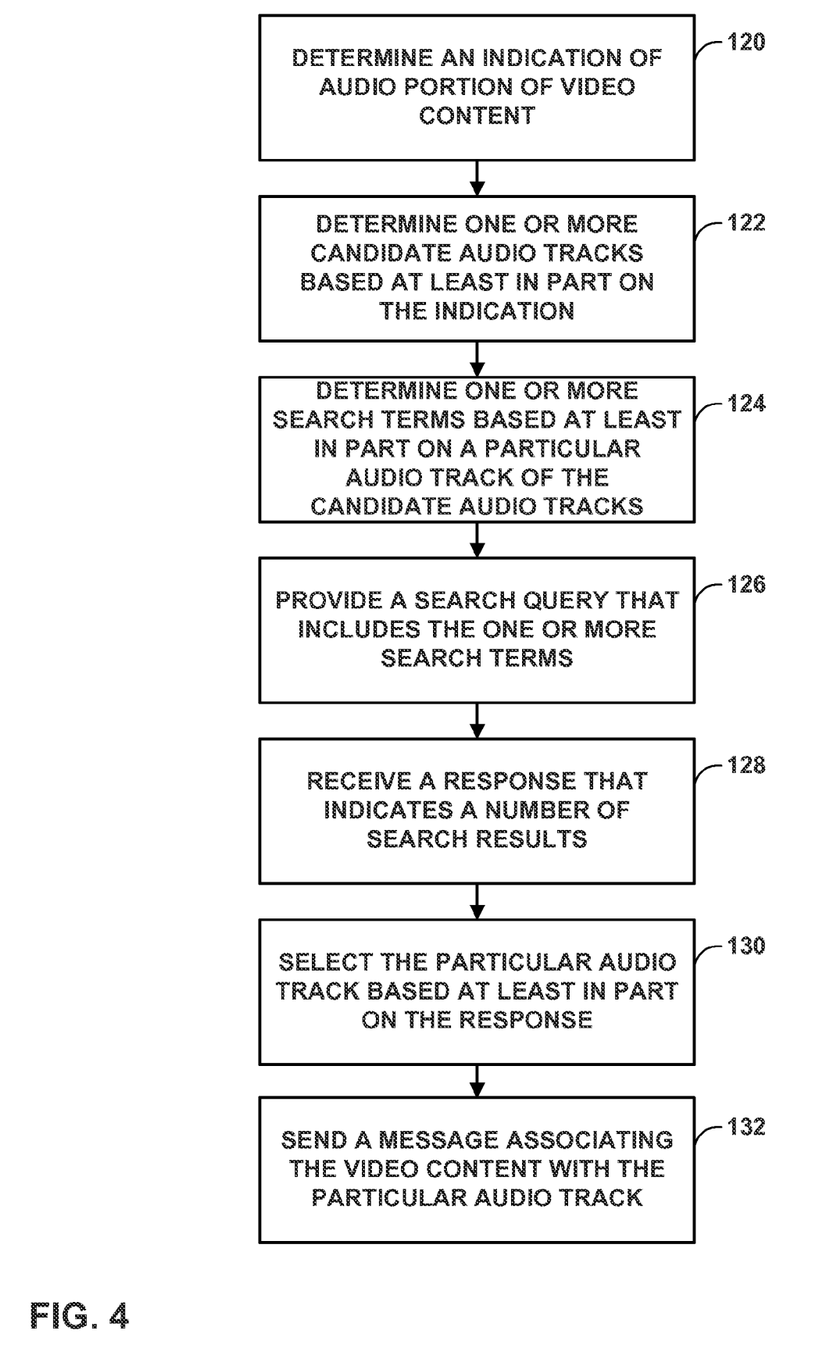
FIG. 4 is a flow diagram illustrating an example process for determining audio tracks to associate with video content, in accordance with one or more aspects of the present disclosure.

FIG. 4 is a flow diagram illustrating an example process for determining audio tracks to associate with video content, in accordance with one or more aspects of the present disclosure. For purposes of illustration only, the example operations are described below within the context of content management unit 14 of content marketplace system 8, as shown in FIGS. 1 and 2.

In the example of FIG. 4, content management unit 14 may determine an indication of an audio portion of video content (120). Content management unit 14 may determine one or more candidate audio tracks based at least in part on the indication (122). Content management unit 14 may determine one or more search terms based at least in part on the one or more candidate audio tracks (124). Content management unit 14 may provide a search query that includes the one or more search terms (126). In response to the search query, content management unit 14 may receive a response that indicates a number of search results (128). In some examples, each one of the search results is associated with content that includes the one or more search terms. Based at least in part on the response, content management unit 14 may select a particular audio track from the candidate audio tracks (130). Content management unit 14 may send a message that associates the video content with at least the particular audio track (132).

In some examples, determining the one or more search terms comprises determining a title of a candidate audio track from the one or more candidate audio tracks, determining an artist of the candidate audio track, and determining a title of the video content. In some examples, determining the one or more search terms comprises determining a composer of a candidate audio track from the one or more candidate audio tracks and determining a title of the video content. In some examples, providing the search query comprises sending instructions to one or more external database servers to perform a search.

In some examples, selecting the particular audio track comprises determining that the number of search results exceeds a specified threshold. In some examples, the search query is a first search query, the response is a first response, and the search results are first search results, the method further comprises sending, by the computing system, a second search query that includes a title of the video content, in response to the second search query, receiving, by the computing system, a second response that indicates a number of second search results, wherein each one of the second search results is associated with content that includes the title of the video content, and determining, by the computing system and based at least in part on the second response, the specified threshold.

In some examples, the one or more search terms are a first set of one or more search terms, the first set of one or more search terms corresponding to a first candidate audio track from the one or more candidate audio tracks, the search query is a first search query, the response is a first response, and the search results are first search results, the method further comprising sending, by the computing system, a second search query that includes a second set of one or more search terms, the second set of one or more search terms corresponding to the second candidate audio track, and in response to the second search query, receiving, by the computing system, a second response that indicates a number of second search results, wherein each one of the second search results is associated with content that includes the second set of one or more search terms, wherein selecting the particular audio track is further based at least in part on the second response. In some examples, selecting the particular audio track comprises determining, based at least in part on the indication, that the first candidate audio track is included in the video content at a time substantially the same as a time at which the second candidate audio track is included in the video content, determining whether the number of first search results is greater than the number of second search results, and in response to determining that the number of first search results is greater than the number of second search results, selecting the first candidate audio track. In some examples, the one or more search terms comprise a plurality of search terms, and wherein the search query comprises instructions to restrict results to content that includes the plurality of search terms within a threshold distance from one another. In some examples, determining the indication comprises determining one or more audio fingerprints of the audio portion of the video content.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium or computer-readable storage device encoded with instructions. Instructions embedded or encoded in an article of manufacture may cause one or more programmable processors, or other processors, to implement one or more of the techniques described herein, such as when the instructions are executed by the one or more processors. Computer readable storage media or storage devices may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable storage media. In some examples, an article of manufacture may include one or more computer-readable storage media.

A computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method comprising:
   determining, by a computing system comprising at least one computing device, an indication of an audio portion of video content;
   determining, by the computing system and based at least in part on the indication, a plurality of candidate audio tracks;
   determining, by the computing system and based at least in part on the plurality of candidate audio tracks and on the video content, a first plurality of search terms, wherein the first plurality of search terms comprises first text data that includes a title of the video content and further includes a title of a first candidate audio track of the plurality of candidate audio tracks;
   determining, by the computing system and based at least in part on the plurality of candidate audio tracks and the video content, a second plurality of search terms, wherein the second plurality of search terms comprises second text data that includes the title of the video content and further includes a title of a second candidate audio track of the plurality of candidate audio tracks, the second candidate audio track being different than the first candidate audio track;
   responsive to providing a first search query that includes the first plurality of search terms, receiving, by the computing system, a first response that indicates a number of first search results, wherein each one of the first search results is associated with content that includes the first plurality of search terms;
   responsive to providing a second search query that includes the second plurality of search terms, receiving, by the computing system, a second response that indicates a number of second search results, wherein each one of the second search results is associated with content that includes the second plurality of search terms;
   responsive to determining that the number of the first search results is greater than the number of the second search results, selecting, by the computing system, the first candidate audio track of the plurality of candidate audio tracks; and
   sending, by the computing system, a message that associates the video content with at least the first candidate audio track.

2. The method of claim 1, wherein determining the first plurality of search terms comprises:
   determining the title of the first candidate audio track;
   determining an artist of the first candidate audio track; and
   determining the title of the video content,
   such that the first text data of the first plurality of search terms further includes the artist of the first candidate audio track.

3. The method of claim 1, wherein determining the first plurality of search terms comprises:
   determining a composer of the first candidate audio track; and
   determining the title of the video content, such that the first text data of the first plurality of search terms further includes the composer of the first candidate audio track.

4. The method of claim 1, wherein providing the first search query comprises sending first instructions to one or more external database servers to perform a first search based on the first search query, and wherein providing the second search query comprises sending second instructions to the one or more external database servers to perform a second search based on the second search query.

5. The method of claim 1, wherein selecting the first candidate audio track comprises determining that the first candidate audio track is included in the audio portion of the video content at a time substantially the same as a time at which the second candidate audio track is included in the audio portion of the video content.

6. The method of claim 1, wherein the first search query comprises instructions to restrict the first search results to content that includes the first plurality of search terms within a threshold distance from one another.

7. The method of claim 1, wherein determining the indication of the audio portion of the video content comprises determining one or more audio fingerprints of the audio portion of the video content.

8. A system comprising:
   at least one processor; and
   a computer-readable storage medium storing instructions that, when executed, cause the at least one processor to:
      determine an indication of an audio portion of video content;
      determine, based at least in part on the indication, a plurality of candidate audio tracks;
      determine, based at least in part on the plurality of candidate audio tracks and on the video content, a first plurality of search terms, wherein the first plurality of search terms comprises first text data that includes a title of the video content and further includes a title of a first candidate audio track of the plurality of candidate audio tracks;
      determine, based at least in part on the plurality of candidate audio tracks and the video content, a second plurality of search terms, wherein the second plurality of search terms comprises second text data that includes the title of the video content and further includes a title of a second candidate audio track of the plurality of candidate audio tracks, the second candidate audio track being different than the first candidate audio track;
      responsive to providing a first search query that includes the first plurality of search terms, receive a first response that indicates a number of first search results, wherein each one of the first search results is associated with content that includes the first plurality of search terms;
      responsive to providing a second search query that includes the second plurality of search terms, receive a second response that indicates a number of second search results, wherein each one of the second search results is associated with content that includes the second plurality of search terms;
      responsive to determining that the number of the first search results is greater than the number of the second search results, select the first candidate audio track of the plurality of candidate audio tracks; and
      send a message that associates the video content with at least the first candidate audio track.

9. The system of claim 8, wherein the instructions that cause the at least one processor to determine the first plurality of search terms further cause the at least one processor to:
   determine the title of the first candidate audio track;
   determine an artist of the first candidate audio track; and
   determine the title of the video content,
   such that the first text data of the first plurality of search terms further includes the artist of the first candidate audio track.

10. The system of claim 8, wherein the instructions that cause the at least one processor to select the particular candidate audio track further cause the at least one processor to determine that the first candidate audio track is included in the audio portion of the video content at a time substantially the same as a time at which the second candidate audio track is included in the audio portion of the video content.

11. The system of claim 8, wherein the first search query comprises instructions to restrict the first search results to content that includes the first plurality of search terms within a threshold distance from one another.

12. A computer-readable storage medium encoded with storing instructions that, when executed, cause one or more processors to perform operations comprising:
   determining an indication of an audio portion of video content;
   determining, based at least in part on the indication, a plurality of candidate audio tracks;
   determining, based at least in part on the plurality of candidate audio tracks and on the video content, a first plurality of search terms, wherein the first plurality of search terms comprises first text data that includes a title of the video content and further includes a title of a first candidate audio track of the plurality of candidate audio tracks;
   determining, based at least in part on the plurality of candidate audio tracks and the video content, a second plurality of search terms, wherein the second plurality of search terms comprises second text data that includes the title of the video content and further includes a title of a second candidate audio track of the plurality of candidate audio tracks, the second candidate audio track being different than the first candidate audio track;
   responsive to providing a first search query that includes the first plurality of search terms, receiving a first response that indicates a number of first search results, wherein each one of the first search results is associated with content that includes the first plurality of search terms;
   responsive to providing a second search query that includes the second plurality of search terms, receiving a second response that indicates a number of second search results, wherein each one of the second search results is associated with content that includes the second plurality of search terms;
   responsive to determining that the number of the first search results is greater than the number of the second search results, selecting the first candidate audio track of the plurality of candidate audio tracks; and
   sending a message that associates the video content with at least the first candidate audio track.

13. The computer-readable storage medium of claim 12, wherein determining the first plurality of search terms comprises:
   determining the title of the first candidate audio track;
   determining an artist of the first candidate audio track; and
   determining the title of the video content,
   such that the first text data of the first plurality of search terms further includes the artist of the first candidate audio track.

14. The computer-readable storage medium of claim 12, wherein providing the first search query comprises sending first instructions to one or more external database servers to perform a first search based on the first search query, and wherein providing the second search query comprises sending second instructions to the one or more external database servers to perform a second search based on the second search query.

15. The method of claim 1, wherein the first search query comprises a first web search query, wherein the first search results comprise a first group of webpages that are each associated with web content that includes the first plurality of search terms, wherein the second search query comprises a second web search query, and wherein the second search results comprise a second group of webpages that are each associated with web content that includes the second plurality of search terms.

16. The system of claim 8, wherein the first search query comprises a first web search query, wherein the first search results comprise a first group of webpages that are each associated with web content that includes the first plurality of search terms, wherein the second search query comprises a second web search query, and wherein the second search results comprise a second group of webpages that are each associated with web content that includes the second plurality of search terms.

17. The computer-readable storage medium of claim 12, wherein the first search query comprises a first web search query, wherein the first search results comprise a first group of webpages that are each associated with web content that includes the first plurality of search terms, wherein the second search query comprises a second web search query, and wherein the second search results comprise a second group of webpages that are each associated with web content that includes the second plurality of search terms.

* * * * *

UNITED STATES PATENT AND TRADEMARK OFFICE
CERTIFICATE OF CORRECTION

PATENT NO. : 9,542,488 B2
APPLICATION NO. : 13/957944
DATED : January 10, 2017
INVENTOR(S) : Matthew Sharifi Page 1 of 1

It is certified that error appears in the above-identified patent and that said Letters Patent is hereby corrected as shown below:

In the Claims

Column 27, Lines 22-23 (Claim 12): Replace "storage medium encoded with storing" with --storage medium storing--

Signed and Sealed this
Seventeenth Day of April, 2018

Andrei Iancu
*Director of the United States Patent and Trademark Office*